Feb. 14, 1928.

W. M. BRADSHAW ET AL 1,658,965

WATER WHEEL REGULATOR

Filed March 26, 1925

WITNESSES:

INVENTORS
William Bradshaw and
Clarence A. Boddie.
BY
ATTORNEY

Patented Feb. 14, 1928.

1,658,965

UNITED STATES PATENT OFFICE.

WILLIAM M. BRADSHAW AND CLARENCE A. BODDIE, OF WILKINSBURG, PENNSYLVANIA, ASSIGNORS TO WESTINGHOUSE ELECTRIC & MANUFACTURING COMPANY, A CORPORATION OF PENNSYLVANIA.

WATER-WHEEL REGULATOR.

Application filed March 26, 1925. Serial No. 18,477.

Our invention relates to speed-regulator systems and has special relation to systems for ensuring operation of a prime mover at constant speed.

One object of our invention is to provide a system of the above-indicated character with hydraulic means for regulating the system.

A further object of our invention is to provide a system of the above-indicated character with a plurality of reactive pressure devices to insure suitable operation of the apparatus.

The present invention is illustrated and described in connection with the control of a water wheel but is not necessarily limited in its application to use with water wheels.

Our invention comprises a water wheel provided with a plurality of gate valves and pressure cylinders for operating the gate valves. The pressure within these pressure cylinders is controlled by a relay valve which is, in turn, controlled by a pilot valve governed in accordance with the speed of the water wheel by any suitable means, such as a flyball governor.

Several reactive devices are provided to react upon the setting of the regulator to prevent hunting action in the system. One of these anti-hunting devices is responsive to the gate movement to react upon the pilot valve; another is responsive to the pressure controlled by the pilot valve and a third is responsive to the changes in velocity pressure within the penstock supplying the water wheel, and this last-named device reacts both upon the pilot valve to change its setting and upon the relay valve to change its setting, independently of the operation of the pilot valve.

Figure 1:
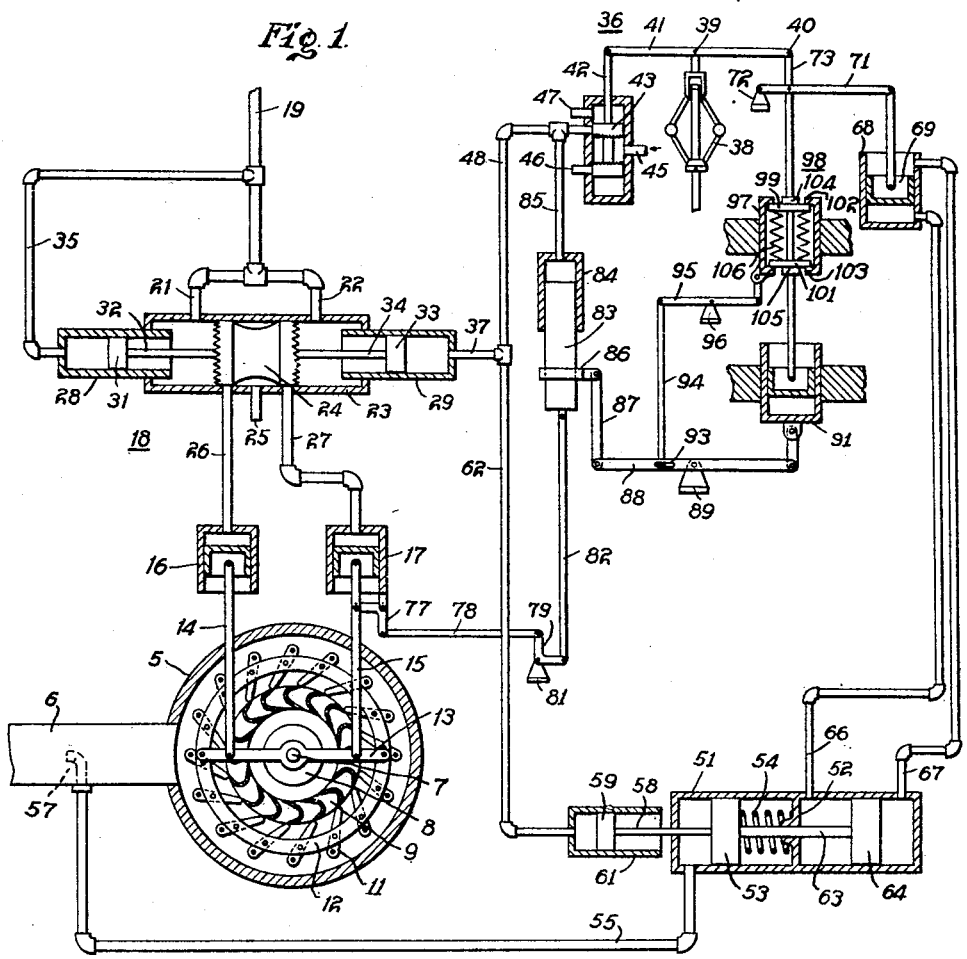
Figure 2:
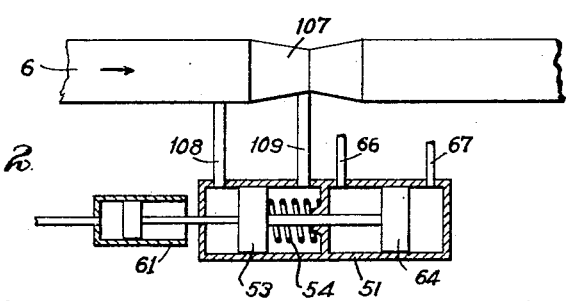

Our invention will be better understood by reference to the accompanying drawing, in which Fig. 1 is a schematic view of apparatus organized in accordance with our invention; and Fig. 2 is a schematic view of a modification of a portion thereof.

Referring to Fig. 1, a water wheel 5 is adapted to receive water under pressure from a penstock 6. The water wheel 5 is mounted upon a shaft 7 and comprises a hub portion 8 and a plurality of vanes 9 carried thereby. Surrounding the vanes 9 are a plurality of guide vanes or gate valves 11 having their outer ends pivotally supported upon a stationary part and having their central portions attached to a ring 12. A transverse lever 13, which is mounted upon the shaft 7 of the water wheel, is secured to the ring 12 and is, in turn, connected to rods 14 and 15 on opposite sides of the shaft 7.

The connecting rods 14 and 15 carry, at their upper ends, pistons 16 and 17, respectively, which are controlled by the operation of a hydraulic relay valve 18. The relay valve 18 is connected to receive fluid under pressure from an inlet pipe 19 through branch pipes 21 and 22 communicating with a valve cylinder 23 on opposite sides of a piston 24.

The cylinder 23 is also provided with a discharge port 25. The relay valve operates to control the pistons 16 and 17 through the supply pipes 26 and 27, respectively. In its normal position, the piston 24 closes the ports leading to pipes 26 and 27.

Connected to the relay valve chamber are pressure cylinders 28 and 29, containing pistons 31 and 33 that are connected, by means of rods 32 and 34, respectively, to opposite ends of the valve piston 24. The cylinder 28 is connected to the inlet pipe 19 by means of a connecting pipe 35. The cylinder 29 is connected to be supplied with pressure through a pipe 37 in accordance with the operation of a pilot valve 36.

The operation of the relay valve 18 is governed by the operation of the pilot valve 36 in accordance with the action of the flyball governor 38 that is connected in a well-known manner to be operated in accordance with the speed of the water wheel 5. The flyball governor 38 is pivoted at 39 to actuate a floating lever 41, which has a stem 42 pivotally connected to one end. The stem 42 is connected to the double piston or valve element 43 of the pilot valve 36. The pilot valve receives fluid, under pressure, from an inlet pipe 45, and is provided with a pair of discharge ports 46 and 47. Leading from the pilot valve chamber, a pipe 48 connects with the cylinder 29 through pipe 37. In its normal position, the valve piston 43 closes the inlet to pipe 48 and the discharge port 46. If the piston 43 moves upwardly, it will cause the inlet pipe 45 to be placed in communication with the pipe 48, thereby permitting the flow of liquid into the chamber 29, and moving the piston 33 toward the left.

If the piston 43 is moved downwardly, the discharge port 46 is placed in communication with the inlet port 45 and the discharge port 47 is in communication with the pipe 48. This will permit the liquid in the chamber 29 to pass out, thus relieving the pressure on the piston 33 and permitting the valve piston 24 to be moved to the right, due to the pressure on the piston 31. The movements of the valve piston 24 open or close the inlets to the pipes 26 and 27, respectively, and thus cause the pistons 16 and 17 to move the gate valves 11 of the water wheel 5.

Movement of the water wheel gate valves causes the velocity pressure of the water in the penstock 6 to increase or decrease, according to the direction of such movement. In order to prevent overtravel of the gate mechanism, it becomes desirable to provide means which will react upon the control mechanism to reset the same prior to the obtaining of normal speed of the water wheel.

In the present invention, an operating cylinder 51 is provided with a partition 52 and with pistons 53 and 64 on opposite sides thereof. Pistons 53 and 64 are connected by means of a rod 63. A spring 54 is provided within the cylinder between the partition 52 and the piston 53. The piston 53 of the cylinder 51 has a second rod 58 that is connected to a pitson 59 operating within a displacement cylinder 61. The displacement cylinder 61 is in communication with the pipe 48 through a pipe 62. One end of the cylinder 51 is connected to the penstock 6 by a pipe 55 that terminates in a curved end 57.

Communicating with the right-hand end of the cylinder 51, at opposite ends of a piston 64, are pipes 66 and 67, the other ends of which communicate with a dash pot 68 having a piston 69 operating therein. The pipes 66 and 67 communicate with the dash pot 68 at opposite ends of the piston 69. The piston 69 is connected to a lever 71 which is pivotally supported at 72 and is connected to a rod 73, which is, in turn, pivotally connected to the floating lever 41 at the point 40.

Operation of the piston 64 causes a circulation of fluid from above and below the piston 69 of the dash pot 68, thereby reacting on the piston 69 to change the position thereof. Movements of the piston 69 are communicated to the lever 71, which moves about the pivot 72 and actuates the floating lever 41 about the pivot 39. This movement of the floating lever 41 will actuate the piston 43 of pilot valve 36 in a direction opposite to that last given it by the flyball governor 38 to thereby reset the valve mechanism prior to the obtaining of normal speed.

When the water-wheel gate valves are opened to admit more water, a still further reaction is desired. To this end, a bell-crank pivotal lever 77 is connected, at one end, to the rod 15, and, at the other end, to a link 78, that is connected to one end of a second bell-crank lever 79 pivoted at its center at 81 and having a rod 82 connected to the end thereof.

The rod 82 is connected to a piston 83 within a displacement cylinder 84 that is in communication with the pipe 48 through a pipe 85. The piston 83 carries a collar 86 that is pivotally connected to one end of a link 87, the other end of which is connected to one end of a lever 88 that is pivoted at 89. The other end of the lever 88 supports the cylinder of an auxiliary dash pot 91 within which is a piston 92 that is operatively connected to the floating lever 41 by means of the connecting rod 73. The lever 88 is provided with a transverse slot 93 to provide an adjustable connection for one end of a rod 94, the other end of which is connected to a lever 95 that is pivotally supported at 96.

The lever 95 is connected also to a casing 97 of a yieldable connection 98, which is located on the rod 73 and consists of disks 99 and 101 slidably mounted on the rod 73 and adapted to be engaged by the end flanges 102 and 103 of the casing 97. Upon the rod 73 are fixed abutments 104 and 105 adapted to engage the loose disks 99 and 101, respectively.

Between the disks 99 and 101 are a plurality of resilient members 106 which press against the disks to urge the rod 73 toward a central position with respect to the casing 97, which is the position illustrated in the drawing. The operation of the system of Fig. 1 is as follows: The flyball governor 38 is operated in accordance with the speed of the water wheel. Should the water-wheel speed fall below normal, the lever 41 would be operated by the governor about the pivot point 40 to raise the stem 42 of the pilot valve 36, thus causing fluid from the inlet 45 to flow into the pipe 48 and into the pipe 85. This would cause the pressure on the piston 33 to increase, moving the piston 24 of the relay valve 18 toward the left and permitting fluid to pass through the pipe 27 to force the piston 17 downwardly, thus opening the gate valves 11. Fluid through the pipe 48 and 62 also acts upon the piston 59, tending to move the pistons 53 and 64 toward the right, and fluid through the pipe 85 tends to move the piston 83 downwardly.

As the gate valves are opened, due to the lowering of the piston 17, the connection between the rod 15 and the rod 82 tends likewise to move the piston 83 downwardly. The pressure upon the piston 83 through the pipe 85 is effective immediately upon the operation of the pilot valve 36, while the reaction, due to the gate-valve movement transmitted through the rod 82, is not effective until the gate-valves are actually in motion. The movement of the piston 83 is transmitted through the levers 88 and 95 to so change the positions of the dash-pot cylinder 91 and the casing 97 as to react upon the pilot valve 36 by moving the lever 41 about the pivot point 39.

As the velocity pressure in the penstock 6 changes, due to the changed flow of water therein, this pressure is transmitted, through the pipe 55, to the piston 53, thus tending to move the piston 64 to the right. The pressure upon the piston 61 is effective immediately upon the operation of the pilot valve, while the pressure upon the piston 53 is effective only upon the changes in the velocity pressure within the penstock, these two pressures cooperating to vary the position of the piston 64.

The piston 64, in turn, reacts to change the setting of the dash-pot piston 69 and to thereby operate the lever 71 about the pivot point 72 to further change the setting of the floating lever 41, operating about the pivot point 39.

Fig. 2 illustrates a device for receiving the changes in velocity pressures within the penstock, using a Venturi tube 107 having a pipe 108 connected to transmit the penstock static pressure to the right-hand side of the piston 53, and a pipe 109 connecting the throat of the venturi to the other side of the piston 53, so that the piston 53 is actuated in accordance with the pressure of the spring 54 and the differences in pressure at the mouth and at the throat of the venturi.

The device illustrated in Fig. 2 operates the same as the device illustrated in Fig. 1, with the exception of the substitution of the venturi, which is sensitive to the velocity flow through the penstock, as registered by differences in static pressures for the curved tube 57, which is sensitive to changes in the velocity pressures.

Many modifications in the system and arrangement and location of parts may be made without departing from the spirit and scope of our invention, and we do not wish to be limited other than by the scope of the appended claims.

We claim as our invention:

1. In a regulator system, the combination with a prime mover and means for controlling the admission of fluid thereto, of control means therefor comprising a relay valve, means for actuating said relay valve in accordance with the speed of the prime mover, and means for reacting upon said control means, said means being actuated in accordance with variations in the velocity of the motive fluid.

2. In a regulator system, the combination with a prime mover and means for controlling the admission of fluid thereto, of control means therefor comprising a relay valve, a pilot valve for actuating said relay valve, governor means actuated in accordance with the speed of the prime mover for actuating said pilot valve, and means actuated in accordance with variations in the velocity of the motive fluid for reaction upon said pilot valve.

3. In a regulator system, the combination with a prime mover and means for controlling the admission of fluid thereto, of control means therefor comprising a relay valve, a pilot valve for actuating said relay valve, governor means actuated in accordance with the speed of the prime mover for actuating said pilot valve, and means actuated in accordance with the variations in the velocity of the motive fluid for reacting upon said relay valve and upon said pilot valve.

4. In a regulator system, the combination with a prime mover, and gate valves for controlling the admission of motive fluid thereto, of control means therefor comprising a pilot valve, means for actuating said pilot valve in accordance with the speed of the prime mover, and means actuated in accordance with the velocity of the motive fluid for reacting upon said control means.

5. In a regulator system, the combination with a prime mover, and gate valves for controlling the admission of motive fluid thereto, of control means therefor comprising a pilot valve, means for actuating said pilot valve in accordance with the speed of the prime mover, and means actuated in accordance with changes in the motive fluid velocity for reacting upon said control means.

6. In a regulator system, the combination with a prime mover, and gate valves for controlling the admission of motive fluid thereto, of control means therefor comprising a pilot valve, means for actuating said pilot valve in accordance with the speed of the prime mover, and a plurality of anti-hunting means for said system, one of said anti-hunting means being responsive to changes in the motive fluid velocity, and one of said anti-hunting means being responsive to the operation of said gate valves.

7. In a regulator system, the combination with a prime mover, and gate valves for controlling the admission of motive fluid thereto, of control means therefor comprising a pilot valve, means for actuating said pilot valve in accordance with the speed of the prime mover, means actuated in accordance with the operation of said gate valves for reacting upon said control means, means actuated in accordance with the operation of said pilot valve for reacting upon said control means, and means actuated in accordance with the velocity of the motive fluid for reacting upon said control means.

8. In a regulator system, the combination with a prime mover and gate means for controlling the admission of motive fluid thereto, of control means therefor comprising a relay valve, a pilot valve for actuating said relay valve, and means for actuating said pilot valve in accordance with the speed of the prime mover, means actuated in accordance with the operation of said gate valves for reacting upon said control means, and means actuated in accordance with the velocity changes of the motive fluid for reacting upon said control means.

9. In a regulator system, the combination with a prime mover and gate means for controlling the admission of motive fluid thereto, of control means therefor comprising a relay valve, a pilot valve for actuating said relay valve, and means for actuating said pilot valve in accordance with the speed of the prime mover, and means actuated in accordance with the velocity changes of the motive fluid for reacting upon said relay valve and for reacting upon said pilot valve.

10. In a regulator system, the combination with a prime mover and gate means for controlling the admission of motive fluid thereto, of control means therefor comprising a relay valve, a pilot valve for actuating said relay valve, and means for actuating said pilot valve in accordance with the speed of the prime mover, means operated in accordance with the operation of said gate valves and in accordance with the operation of said pilot valve for reacting upon said control means, and means actuated in accordance with the velocity changes of the motive fluid for reacting upon said control means.

In testimony whereof, we have hereunto subscribed our names this 13th day of March, 1925.

WILLIAM M. BRADSHAW.
CLARENCE A. BODDIE.